US006952331B2

(12) United States Patent
Chang (10) Patent No.: US 6,952,331 B2
(45) Date of Patent: Oct. 4, 2005

(54) POSITIONER FOR PRECISELY MOVING AN E-BLOCK OF A DISK DRIVE

(75) Inventor: Ken Chang, Saratoga, CA (US)

(73) Assignee: Maxtor Corporation, Longmont, CO (US)

(*) Notice: Subject to any disclaimer, the term of this patent is extended or adjusted under 35 U.S.C. 154(b) by 682 days.

(21) Appl. No.: 09/768,974

(22) Filed: Jan. 23, 2001

(65) Prior Publication Data

US 2002/0097527 A1 Jul. 25, 2002

(51) Int. Cl.[7] .................................................. G11B 5/33
(52) U.S. Cl. ...................................................... 360/324.1
(58) Field of Search ............................ 360/294.3, 264.7

(56) References Cited

U.S. PATENT DOCUMENTS

| 5,119,253 | A | * | 6/1992 | Kotani ........................ 310/36 |
| 5,295,031 | A | * | 3/1994 | Wasson ................... 360/264.9 |
| 5,963,398 | A | * | 10/1999 | Tohkairin ................ 360/264.7 |
| 6,225,712 | B1 | * | 5/2001 | Miyamoto et al. ............ 310/15 |
| 6,633,457 | B1 | * | 10/2003 | Lin et al. ................. 360/264.9 |

* cited by examiner

Primary Examiner—A. J. Heinz
Assistant Examiner—Mark Blouin
(74) Attorney, Agent, or Firm—David M. Sigmond (57) ABSTRACT

A positioner (20) for a disk drive (10) that includes a magnet assembly (52), a conductor assembly (54), and a control system (22) is provided herein. The magnet assembly (52) includes a pair of magnet arrays (56A) (56B) and a pair of spaced apart flux return plates (75A) (75B). The conductor assembly (54) includes a coil array (78). The coil array includes a first portion (84) and a second portion (86) that are positioned substantially perpendicular to a longitudinal axis (43) of an E-block (16). The control system (22) directs current to electrically excite the first and second portions (84) (86) to generate a first force $F_1$ and a second force $F_2$ which are (i) parallel to the longitudinal axis (43) of the E-block (16), and (ii) equal in magnitude and directionally opposite to better position a data transducer (50) on a target track (32) of a storage disk (28).

68 Claims, 3 Drawing Sheets

POSITIONER FOR PRECISELY MOVING AN E-BLOCK OF A DISK DRIVE

FIELD OF THE INVENTION

The present invention relates generally to disk drives for storing and retrieving data. More specifically, the present invention relates to a positioner for a disk drive that precisely positions and maintains a data transducer on a target track of a storage disk. Further, the positioner is uniquely designed to minimize wear on an E-block and thereby decrease the likelihood of track misregistration.

BACKGROUND

Disk drives are widely used in computers and data processing systems for storing information in digital form. These disk drives commonly use one or more rotating storage disks to store data in digital form. Each storage disk typically includes a data storage surface on each side of the storage disk. These storage surfaces are divided into a plurality of narrow, annular regions of different radii, commonly referred to as "tracks". Typically, a head stack assembly having a positioner and an E-block is used to position a data transducer of a transducer assembly proximate each data storage surface of each storage disk. The data transducer transfers information to and from the storage disk when precisely positioned on the appropriate track of the storage surface. The transducer assembly also includes a load beam and a suspension for supporting the data transducer.

The need for increased storage capacity and compact construction of the disk drive has led to the use of disks having increased track density or decreased track pitch, i.e., more tracks per inch. As the tracks per inch increase, the ability to maintain the data transducer on a target track becomes more difficult. More specifically, as track density increases, it is necessary to reduce positioning error of the data transducer proportionally. With these systems, the accurate and stable positioning of the data transducer proximate the appropriate track is critical to the accurate transfer and/or retrieval of information from the rotating storage disks.

One attempt to improve positioning accuracy includes increasing the servo bandwidth of the positioner. Unfortunately, as the bandwidth of the positioner is increased, it approaches a resonant frequency of the head stack assembly and it becomes more difficult to keep the positioner stable.

Another attempt to raise servo bandwidth of the head stack assembly includes securing a pair of piezoelectric motors to the load beam of each transducer assembly. This configuration is known in the industry as a dual stage actuator. Unfortunately, existing dual actuators are not entirely satisfactory. For example, existing dual stage actuators typically add substantial cost to the disk drive because every transducer assembly includes a pair of piezoelectric motors. Further, the drive electronics for the dual stage actuator is more complex due to the need to generate positive and negative voltages well beyond the supply rails.

Yet another attempt to improve positioning accuracy includes utilizing a positioner having a pair of vertically offset coil arrays. This positioner design eliminates the major resonant frequency and allows for higher servo bandwidth by the positioner. Unfortunately, the vertically offset coil arrays generate a twisting moment on the E-block that can greatly influence the accuracy of positioning and can cause wear on the E-block.

In light of the above, it is an object of the present invention to significantly increase the servo bandwidth of the head stack assembly. Another object of the present invention is to provide a positioner that accurately positions the data transducers. Still another object of the present invention is to provide a positioner that prevents the exciting of the system mode at the E-block pivot center. Yet another object of the present invention is to increase servo bandwidth without the use of piezoelectric motors on each transducer assembly. Yet another object of the present invention is to reduce the cost of manufacturing a high-density disk drive.

SUMMARY

The present invention is directed to a positioner for a head stack assembly of a disk drive. The disk drive includes one or more storage disks. The head stack assembly also includes an E-block, and one or more data transducers. The positioner moves the E-block and the data transducers relative to the storage disks of the disk drive. The positioner includes a magnet assembly, a conductor assembly, and a control system. The magnet assembly generates a magnetic field. The conductor assembly includes a coil array that is positioned near the magnet assembly. The control system electrically excites the coil array to interact with the magnetic field of the magnet assembly.

As provided herein, the coil array includes a first portion and a second portion that are positioned substantially perpendicular to a longitudinal axis of the E-block. Importantly, the first and second portions are the only aspects of the coil array that are effectively positioned within the magnetic field. Preferably, the control system electrically excites the first and second portions to generate a first force and a second force to move the E-block, and thus the data transducer, relative to the storage disk. Typically, the first and second forces are equal in magnitude, but opposite in direction, and the forces generated are substantially parallel to the longitudinal axis of the E-block.

As a result of this coil array design, the electrically excited coil array interacts with the magnetic field to create equal and opposite forces relative to an E-block pivot center of the E-block. Moreover, as a result of this design, the positioner avoids the exciting of the major system mode at the E-block pivot center and the servo bandwidth of the positioner can be increased. Further, the accuracy in which the positioner positions the data transducer is increased.

The present invention is also directed to a method for retrieving data from a target track on a rotating storage disk of a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
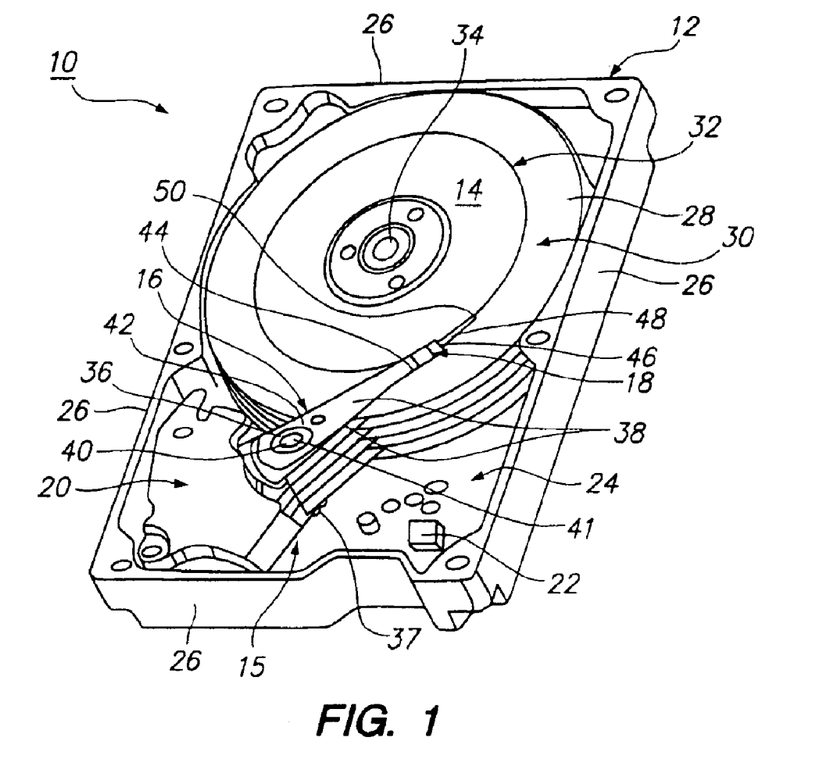
FIG. 1 is a perspective view of a disk drive having features of the present invention.

Referring initially to FIG. 1, a disk drive 10 according to the present invention includes (i) a drive housing 12, (ii) a disk assembly 14, (iii) a head stack assembly 15 including an E-block 16, and one or more transducer assemblies 18, a positioner 20 and (iv) a control system 22. The positioner 20 provided herein positions the transducer assemblies 18 with improved accuracy, avoids exciting the major system mode of the head stack assembly 15, and has a higher servo bandwidth.

A detailed description of the various components of a disk drive 10 is provided in U.S. Pat. No. 5,208,712, issued to Hatch et al., and assigned to Maxtor Corporation, the assignee of the present invention. The contents of U.S. Pat. No. 5,208,712 are incorporated herein by reference. Accordingly, only the structural aspects of a disk drive 10 that are particularly significant to the present invention, are provided in detail herein.

The drive housing 12 retains the various components of the disk drive 10. The drive housing 12, illustrated in FIG. 1, includes a base 24 and four (4) side walls 26. A typical drive housing 12 also includes a cover (not shown) that is spaced apart from the base 24 by the side walls 26. The drive housing 12 is typically installed in the case of a computer (not shown) or a word processor (not shown).

The disk assembly 14 includes one or more storage disks 28 that store data in a form that can be subsequently retrieved if necessary. Magnetic storage disks 28 are commonly used to store data in digital form. For conservation of space, each storage disk 28 preferably includes a data storage surface 30 on each side of the storage disk 28. These storage surfaces 30 are typically divided into a plurality of narrow annular regions of different radii, commonly referred to as "tracks." The positioner 20 provided herein allows for the use of storage disks 28 having higher track densities. The storage disks 28 are manufactured by ways known to those skilled in the art.

A target track 32 that contains the desired data (not shown) is illustrated in FIG. 1 on the top storage surface 30 on the top storage disk 28. It should be noted that the target track 32 illustrated in FIG. 1 is for reference and that any of the tracks on any of the storage disks 28 can be the target track 32.

Depending upon the design of the disk drive 10, any number of storage disks 28 can be used with the disk drive 10. For example, the disk drive 10 can include one (1), two (2), three (3), six (6), nine (9), or twelve (12) storage disks 28. For two-sided storage disks 28, the disks 28 are spaced apart a sufficient distance so that at least one (1) transducer assembly 18 can be positioned proximate each of the storage surfaces 30 of adjacent storage disks 28. To conserve space, a centerline (not shown) of consecutive disks 28 provides disks 28 typically spaced apart between about one millimeter (1.0 mm) to three millimeters (3.0 mm).

The storage disks 28 are mounted on a disk spindle 34 that is mounted to a spindle shaft (not shown). The spindle shaft is secured to the base 24. The disk spindle 34 rotates on a disk axis (not shown) relative to the spindle shaft on a spindle bearing assembly (not shown). Typically, the disk spindle 34 and the storage disks 28 are rotated about the disk axis at a predetermined angular velocity by a spindle motor (not shown). The rotation rate of the storage disks 28 varies according to the design of the disk drive 10.

As can best be seen with reference to FIG. 1, the E-block 16 includes an actuator hub 36 and a plurality of parallel actuator arms 38 that are attached to and cantilever from the actuator hub 36. In the embodiment illustrated in FIG. 1, the actuator hub 36 is substantially tubular and can be mounted to an actuator shaft 40. The actuator hub 36 rotates on an E-block pivot center 41 relative to the actuator shaft 40 on an actuator bearing assembly (not shown). The E-block 16 also includes a longitudinal axis 43 that is positioned along the actuator arms 38.

The actuator arms 38 move with the actuator hub 36 and position the transducer assemblies 18 between the storage disks 28, proximate the data storage surfaces 30. Each actuator arm 38 includes a proximal section 42 that is secured to the actuator hub 36 and a distal section 44 that cantilevers away from the actuator hub 36. The spacing of the actuator arms 38 varies according to the spacing of the storage disks 28. The distance between consecutive actuator arms 38 is typically between about one millimeter (1 mm) to three millimeters (3 mm).

The transducer assemblies 18 transfer or transmit information between the computer (not shown) or word processor (not shown) and the storage disks 28. Typically, each transducer assembly 18 includes a load beam 46, a flexure 48, and a data transducer 50. The load beam 46 attaches the flexure 48 and the data transducer 50 to the E-block 16. Preferably, each load beam 46 is flexible in a direction perpendicular to the storage disk 28 and acts as a spring for supporting the data transducer 50.

Each flexure 48 is used to attach one (1) of the data transducers 50 to one (1) of the load beams 46. Typically, each flexure 48 includes a plurality of conductive flexure traces (not shown) that are electrically connected to the data transducer 50. Each flexure 48 is subsequently attached to a flex circuit (not shown) that electrically connects the flexures 48 to the disk drive 10.

Each data transducer 50 interacts with one (1) of the storage disks 28 to access or transfer information to the storage disk 28. For a magnetic storage disk 28, the data transducer 50 is commonly referred to as a read/write head.

Figure 2:
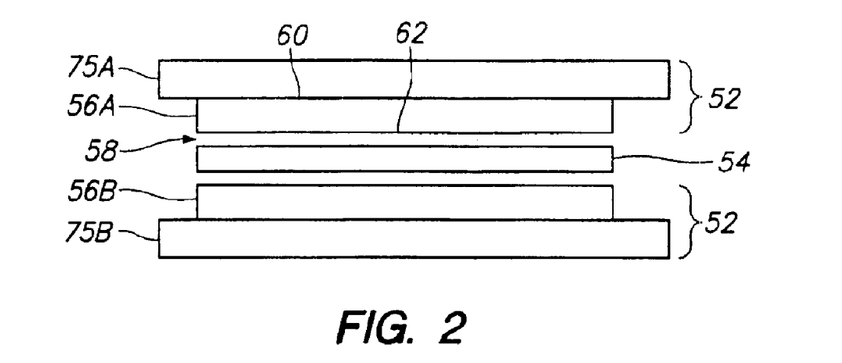
FIG. 2 is a side view of a magnet assembly having features of the present invention.

The positioner 20 precisely moves and positions the E-block 16 and the data transducers 50 relative to the storage disks 28. The design of the positioner 20 can be varied in accordance with the teachings provided herein. Referring to FIG. 2, the positioner 20 includes a magnet assembly 52 and a conductor assembly 54. As provided herein, the positioner 20 positions and maintains the position of the data transducers 50 with improved accuracy, eliminates the major system mode of the head stack assembly 15, and allows for a higher servo bandwidth.

The magnet assembly 52 includes one or more magnet arrays. In the embodiment illustrated in FIGS. 2 and 4, the magnet assembly 52 includes an upper magnet array 56A and a lower magnet array 56B that are spaced apart by an air gap 58. Each magnet array 56A, 56B includes one or more magnets. Alternatively, the positioner 20 could include a single magnet array.

As illustrated in FIGS. 2–5, each magnet array 56A, 56B is generally butterfly shaped and includes a substantially flat top surface 60, a spaced apart, substantially flat bottom surface 62, an arc-shaped inner side 64, an outer side 66, and a pair of side wings 68. Preferably, the inner side 64 of each magnet array 56A, 56B generally forms an arc of a circle, the center of which is approximately located at the E-block pivot center 41. The outer side 66 is somewhat curved, with a concavity the reverse that of the inner side 64.

Alternatively, for example, the outer side 66 can be somewhat linear in configuration. The side wings 68 are typically mirror images of each other, and can be generally curved, for example. Moreover, the side wings 68 connect the inner side 64 to the outer side 66 along a perimeter of the magnet array.

Figure 3:
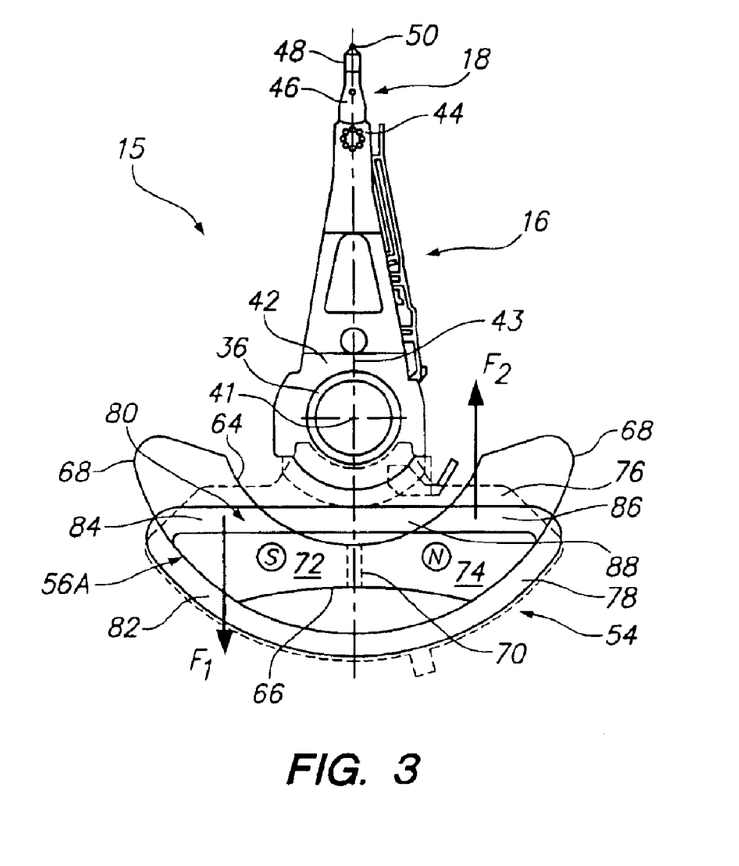
FIG. 3 is a top view of a head stack assembly having features of the present invention.
Figure 4:
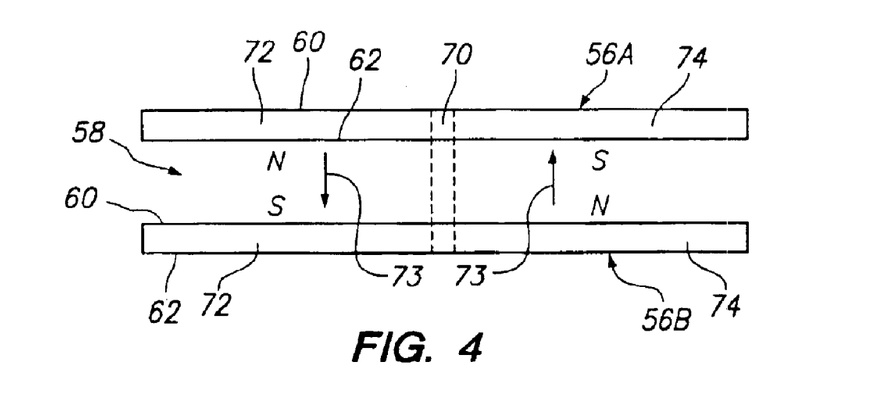
FIG. 4 is a side view of one embodiment of an upper magnet array and a lower magnet array.
Figure 5:
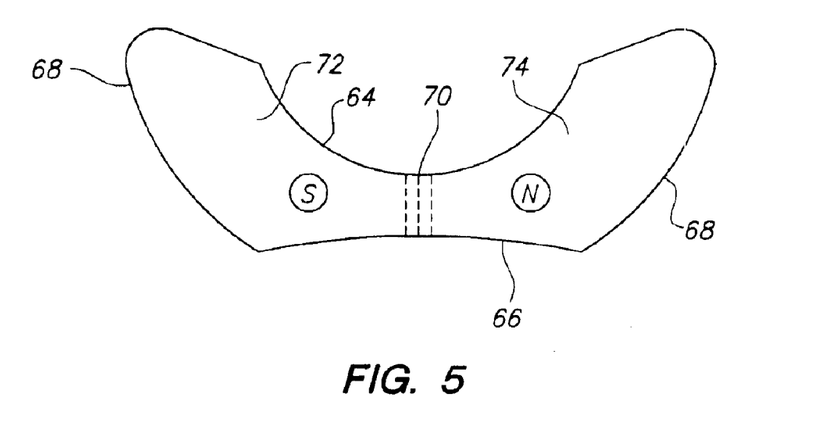
FIG. 5 is a top view of an embodiment of the upper magnet array depicted in FIG. 4.

Referring to FIGS. 3, 4 and 5, a transition zone 70 vertically divides each magnet array 56A, 56B into a first sector 72 and a second sector 74 which are side-by-side. The transition zone 70 is represented by dashed lines. Each of the sectors 72, 74, when magnetized, has a north pole and a south pole. The poles of the first and second sectors 72, 74, for the upper magnet array 56A are inverted and the first and second sectors 72, 74 for the lower magnet array 56B are inverted. Further, (i) the poles of the first sector 72 of the upper magnet array 56A and poles of first sector 72 of the lower magnet array 56B are opposed and (ii) the poles of the second sector 74 of the upper magnet array 56A and poles of the second sector 74 of the lower magnet array 56B are opposed. Referring to FIG. 4, as a result of this design, the magnetic fields 73 (represented as an arrow) between the first sectors 72 of the magnet arrays 56A, 56B are opposite from the magnetic fields 73 between the second sectors 74 of the magnet arrays 56A, 56B.

As illustrated in FIG. 2, the magnet assembly 52 preferably includes an upper flux return plate 75A and a spaced apart lower flux return plate 75B. The flux return plates 75A, 75B serve as a return path for magnetic fields from the magnet arrays 56A, 56B. Each return plate 75A, 75B is preferably made of a magnetically permeable material such as a soft iron or steel. Typically, the return plates 75A, 75B are secured to the base 24. Further, the upper magnet array 56A is secured to the upper return plate 75A and the lower magnet array 56B is secured to the lower return plate 75B.

The conductor assembly 54 includes a conductor housing 76 and a coil array 78. Preferably, the conductor housing 76 (illustrated in phantom in FIG. 3) secures the coil array 78 to the E-block 16, with the coil array 78 positioned in the air gap 58 between the magnet arrays 56A, 56B. The conductor housing 76 can be a separate component from the E-block 16 or the conductor housing 76 can be formed as a unitary portion of the E-block 16.

The coil array 78 interacts with the magnet assembly 52 to precisely move the E-block 16 and each data transducer 50 relative to the storage disks 28. As an overview, the coil array 78 includes a wire that is wrapped into a plurality of turns. Because the conductor assembly typically includes only one coil array 78, the positioner 20 does not generate a twisting moment on the E-block 16 and the size of the positioner 20 is not increased.

FIG. 3 illustrates one embodiment of a coil array 78 having features of the present invention. In this embodiment, the coil array 78 is a somewhat flat, generally D-shaped loop that includes a substantially linear first segment 80 and a curved, arc shaped, second segment 82. The first segment 80 and the second segment 82 are connected to and adjacent to one another at a pair of corners disposed on opposites sides of the longitudinal axis 43 of the E-block 16. The coil array 78 is secured to the E-block 16 with (i) the first segment 80 extending substantially perpendicular to the longitudinal axis 43, and (ii) the second segment 82 forming an arc that is centered at the E-block pivot center 41. Moreover, the first segment 80 and the second segment 82 are preferably positioned symmetrically about the longitudinal axis 43 of the E-block 16. For purposes of this discussion, the first segment 80 can be divided into a first portion 84, a second portion 86, and a center portion 88. The first portion 84, the second portion 86, and the center portion 88 are preferably oriented substantially perpendicular to the longitudinal axis 43 of the E-block 16. The center portion 88 is positioned between the first portion 84 and the second portion 86, and connects the first portion 84 to the second portion 86 to form a continuous first segment 80 of the coil array 78.

The first portion 84 and the second portion 86 are positioned directly between the magnet arrays 56A, 56B. Such positioning allows the first portion 84 and the second portion 86 to interact with the magnetic fields 73 produced by the magnet arrays 56A, 56B. Specifically, the first portion 84 is positioned between the first sectors 72 of the magnet arrays 56A, 56B. The second portion 86 is positioned between the second sectors 74 of the magnet arrays 56A, 56B. On the other hand, the center portion 88 is typically not positioned directly between the magnet arrays 56A, 56B. Thus, the center portion 88 is effectively positioned outside of the magnetic fields 73. FIG. 3 illustrates that the center portion 88 is bounded by a superimposition of the arc-shaped inner side 64 of each magnet array 56A, 56B. The first portion 84 is bounded by the arc-shaped inner side 64 and side wing 68 of the first sector 72. The second portion 86 is bounded by the arc-shaped inner side 64 and the side wing 68 of the second sector 74.

Preferably, the first segment 80 is substantially positioned nearer the E-block 16 than the second segment 82. The second segment 82 typically forms an arc of a circle with its center located approximately at the E-block pivot center 41. Normally, the second segment 82 is not positioned between the magnet arrays 56A, 56B. Thus, the second segment 82 is effectively positioned outside of the magnetic fields 73 of the magnet arrays 56A, 56B. In this embodiment, the magnet assembly 52 and the conductor assembly 54 are designed so that the only portions of the coil array 78 which are positioned directly between the magnet arrays 56A, 56B are the first portion 84 and the second portion 86 during rotation of the E-block 16. As a result, only the first portion 84 and the second portion 86 substantially interact with the magnetic fields 73.

The control system 22 directs current to the coil array 78 to electrically excite the coil array 78 and move the coil array 78 relative to the magnet assembly 52 thereby moving the data transducer 50 relative to the storage disk 28. In this design, the electrically excited coil array 78 interacts with the magnet assembly 52 to create a Lorentz type force that moves the coil array 78 relative to the magnet assembly 52. The resultant magnetic fields 73 of the magnet assembly 52 are such that current passing through the coil array 78 in one direction causes rotation of the actuator arms 38 in one radial direction relative to the disks 28 (such as the radially outward direction) while reverse current causes reverse direction movement (such as the radially inward direction).

More specifically, referring to FIG. 3, the control system 22 directs current to the coil array 78 so that the electrically excited first portion 84 generates a first force $F_1$ that is substantially equal and opposite to a second force $F_2$ generated by the electrically excited second portion 86. More specifically, the control system 22 directs current in the same magnitude and direction to the first portion 84 and the second portion 86. Further, the first portion 84 is immersed in magnetic fields 73 between the first sectors 72 of the magnet arrays 56A, 56B while the second portion 86 is immersed in magnetic fields 73 between the second sectors 74 of the magnet arrays 56A, 56B. As discussed above, the magnetic fields 73 between the first sectors 72 are substantially opposite from the magnetic fields 73 between the second sectors 74. With this design, when the first portion 84 and the second portion 86 are energized by the control system 22, each portion 84, 86, is positioned in a magnetic field 73 pointing in an opposite direction. As a result of this design, the first force $F_1$ created by the electrically excited first portion 84 is in the opposite direction as the second force $F_2$ created by the electrically excited second portion 86.

In addition, because the first portion 84 and the second portion 86 are positioned substantially perpendicular to the longitudinal axis 43 of the E-block 16, the resultant first and second forces $F_1$, $F_2$, are substantially parallel to the longitudinal axis 43 of the E-block 16. Reversing current to the coil array 78 results in generating a first force $F_1$, and a second force $F_2$ that are directionally 180 degrees from the first force $F_1$ and the second force $F_2$, respectively, shown in FIG. 3.

Because the first force $F_1$, and the second force $F_2$ are equal in magnitude and directionally opposite, a "force couple" results. Thus, there is no resulting net reaction force on the actuator hub 36. Further, excitation of the system mode is reduced, causing less wear on the actuator hub 36, longer life of the actuator hub 36, and a decreased likelihood of track misregistration.

While the particular positioner 20 and disk drive 10 as herein shown and disclosed in detail is fully capable of attaining the objectives and providing the advantages herein before stated, it is to be understood that it is merely illustrative of the presently preferred embodiments of the invention and that no limitations are intended to the details of construction or design herein shown other than as described in the appended claims.

What is claimed is:

1. A positioner for moving an E-block and a data transducer of a disk drive relative to a storage disk, the E-block having a longitudinal axis, the positioner comprising:
    a magnet assembly producing a magnetic field; and
    a coil array that couples to the E-block and is positioned near the magnet assembly, the coil array being a generally D-shaped loop including a first segment and a second segment that are adjacent to one another, the first segment being positioned substantially perpendicular to the longitudinal axis of the E-block and adapted to interact with the magnetic field to move the E-block relative to the storage disk, and the second segment being curved where it intersects the longitudinal axis.

2. The positioner of claim 1 wherein the first segment is substantially linear.

3. The positioner of claim 2 wherein the first segment includes (i) a first portion positioned on one side of the longitudinal axis of the E-block, and (ii) a second portion positioned on an opposite side of the longitudinal axis E-block, wherein the first and second portions are adapted to interact with the magnetic field to move the E-block relative to the storage disk.

4. The positioner of claim 3 wherein the first and second portions are positioned substantially symmetrical relative to the longitudinal axis.

5. The positioner of claim 3 further comprising a control system, that directs current to the coil array to electrically excite the first portion and the second portion, the electrically excited first portion interacting with the magnetic field to generate a first force, and the electrically excited second portion interacting with the magnetic field to generate a second force.

6. The positioner of claim 5 wherein the first and second forces are substantially parallel to the longitudinal axis, and wherein the first force is substantially equal in magnitude and substantially opposite in direction to the second force.

7. The positioner of claim 3 wherein the magnet assembly includes an upper magnet array and a lower magnet array, and wherein the first and second portions are positioned substantially between the upper and lower magnet arrays.

8. The positioner of claim 3 wherein the first segment further includes a center portion, the center portion being positioned between the first and second portions, the center portion electrically connecting the first portion to the second portion, the center portion being positioned such that the center portion does not substantially interact with the magnetic field when the center portion is electrically excited.

9. The positioner of claim 3 wherein the second segment is positioned relative to the magnet assembly such that the second segment does not interact with the magnetic field when the second segment is electrically excited.

10. The positioner of claim 1 wherein the only portion of the coil array that interacts with the magnetic field of the magnet assembly when the coil array is electrically excited is positioned substantially perpendicular to the longitudinal axis of the E-block.

11. A head stack assembly including an E-block and the positioner of claim 1.

12. A disk drive including the positioner of claim 1.

13. A head stack assembly for moving a data transducer of a disk drive relative to a target track of a storage disk, the head stack assembly comprising:
    an E-block having a longitudinal axis;
    a transducer assembly secured to the E-block, the transducer assembly including a data transducer;
    a positioner including (i) a magnet assembly producing a magnetic field and (ii) a coil array secured to the E-block and positioned near the magnet assembly, the coil array being a generally D-shaped loop including a first segment and a second segment that are adjacent to one another, wherein the first segment is substantially linear, positioned substantially perpendicular to the longitudinal axis and includes (i) a first portion, and (ii) a second portion, and the second segment forms an arc that has a substantially continuous curvature and is curved where it intersects the longitudinal axis; and
    a control system that directs current to the coil array to move the data transducer relative to the target track.

14. The head stack assembly of claim 13 wherein the control system (i) directs current to the first portion to electrically excite the first portion, and (ii) directs current to the second portion to electrically excite the second portion; wherein (i) the electrically excited first portion interacts with the magnetic field to generate a first force and (ii) the electrically excited second portion interacts with the magnetic field to generate a second force; and
    wherein (i) the first force is substantially equal in magnitude to the second force and (ii) the first force is substantially opposite in direction to the second force.

15. The head stack assembly of claim 14 wherein the first and second forces are substantially parallel to the longitudinal axis.

16. The head stack assembly of claim 15 wherein the first portion and the second portion are positioned symmetrical to the longitudinal axis.

17. The head stack assembly of claim 16 wherein the first segment further includes a center portion, the center portion being positioned between and connected to the first portion and the second portion.

18. The head stack assembly of claim 17 wherein the center portion does not substantially interact with the magnetic field.

19. A disk drive including a storage disk, a drive housing and the head stack assembly of claim 16 movably secured to the drive housing.

20. A method for retrieving data from a target track on a rotating storage disk of a disk drive, the method comprising the steps of:
providing an E-block with a longitudinal axis;
securing a transducer assembly to the E-block, the transducer assembly including a data transducer;
providing a magnet assembly producing a magnetic field;
coupling a coil array to the E-block with the coil array being positioned near the magnet assembly, the coil array being a generally D-shaped loop including a first segment and a second segment that are adjacent to one another, the first segment including (i) a first portion, and (ii) a second portion, the first and second portions being perpendicular to the longitudinal axis, the first and second portions being positioned symmetrically about the longitudinal axis, and the second segment forming an arc that has a substantially continuous curvature and is curved where it intersects the longitudinal axis; and
directing current to the coil array to move the data transducer relative to the target track.

21. The method of claim 20 wherein directing current to the coil array includes directing current to the first portion and the second portion to generate a first force and a second force, respectively, wherein the first force is substantially equal in magnitude and opposite in direction to the second force.

22. The method of claim 21 wherein the first force and the second force are substantially parallel to the longitudinal axis.

23. A positioner for moving a data transducer relative to a storage disk in a disk drive, the positioner comprising:
a magnetic assembly including an upper magnetic array and a lower magnetic array; and
a coil array between the magnetic arrays, wherein the coil array is a generally D-shaped loop that includes a first segment and a second segment that are adjacent to one another, the first segment is substantially linear and the second segment forms an arc that has a substantially continuous curvature and is curved where it intersects a longitudinal axis of a head stack assembly that includes the data transducer.

24. The positioner of claim 23 wherein the first segment is linear.

25. The positioner of claim 24 wherein the first segment is substantially perpendicular to the longitudinal axis.

26. The positioner of claim 25 wherein the second segment forms an arc that is centered at a pivot center of the head stack assembly.

27. The positioner of claim 25 wherein the first and second segments are positioned symmetrically about the longitudinal axis.

28. The positioner of claim 25 wherein the first segment includes a first portion, a second portion and a center portion therebetween, the first and second portions are positioned between the magnetic arrays, and the center portion is not positioned between the magnetic arrays.

29. The positioner of claim 23 wherein the magnetic arrays each include an inner side, an outer side, and a pair of side wings therebetween, the inner side faces towards the data transducer and forms an arc, and the outer side faces away from the data transducer.

30. The positioner of claim 29 wherein the inner side forms an arc that is centered at a pivot center for the data transducer.

31. The positioner of claim 29 wherein the inner and outer sides are curved with reverse concavity relative to one another.

32. The positioner of claim 29 wherein first and second segments are adjacent to one another at a pair of corners disposed on opposites sides of the longitudinal axis.

33. The positioner of claim 32 wherein the corners are substantially aligned with the wings in a direction perpendicular to the longitudinal axis.

34. The positioner of claim 32 wherein the corners are not substantially aligned with the wings in a direction parallel to the longitudinal axis.

35. The positioner of claim 23 wherein the magnetic arrays extend a first distance parallel to the longitudinal axis, the coil array extends a second distance parallel to the longitudinal axis, and the first distance is greater than the second distance.

36. The positioner of claim 23 wherein the magnetic arrays extend a first distance perpendicular to the longitudinal axis, the coil array extends a second distance perpendicular to the longitudinal axis, and the first and second distances are essentially identical.

37. A positioner for moving a data transducer relative to a storage disk in a disk drive, the positioner comprising:
a magnetic assembly including an upper magnetic array and a lower magnetic array;
a coil array between the magnetic arrays, wherein the coil array is a generally D-shaped loop of wire wrapped into a plurality of turns that includes a first segment and a second segment that are adjacent to one another, the first segment is substantially linear and the second segment forms an arc that has a substantially continuous curvature and is curved where it intersects a longitudinal axis of a head stack assembly that includes the data transducer; and
a control system that electrically excites the coil array to interact with a magnetic field of the magnetic assembly.

38. The positioner of claim 37 wherein the first segment includes a first portion, a second portion and a center portion therebetween, the first and second portions are positioned between the magnetic arrays, and the center portion is not positioned between the magnetic arrays.

39. The positioner of claim 37 wherein the magnetic arrays extend a first distance parallel to the longitudinal axis, the coil array extends a second distance parallel to the longitudinal axis, and the first distance is greater than the second distance.

40. The positioner of claim 37 wherein the magnetic arrays extend a first distance perpendicular to the longitudinal axis, the coil array extends a second distance perpendicular to the longitudinal axis, and the first and second distances are essentially identical.

41. A head stack assembly for moving a data transducer of a disk drive relative to a target track of a storage disk, the head stack assembly comprising:
an E-block having a longitudinal axis;
a transducer assembly secured to the E-block, the transducer assembly including a data transducer;
a positioner including (i) a magnet assembly producing a magnetic field, (ii) a coil array secured to the E-block and positioned near the magnet assembly, the coil array being a generally D-shaped loop including a first segment and a second segment that are adjacent to one another. wherein the first segment is positioned substantially perpendicular to the longitudinal axis and includes (i) a first portion, and (ii) a second portion, and the second segment is curved where it intersects the longitudinal axis; and a control system that directs current to the coil array to move the data transducer relative to the target track;

wherein the control system (i) directs current to the first portion to electrically excite the first portion, and (ii) directs current to the second portion to electrically excite the second portion;

wherein (i) the electrically excited first portion interacts with the magnetic field to generate a first force and (ii) the electrically excited second portion interacts with the magnetic field to generate a second force; and wherein (i) the first force is substantially equal in magnitude to the second force and (ii) the first force is substantially opposite in direction to the second force.

42. The head stack assembly of claim 41 wherein the first and second forces are substantially parallel to the longitudinal axis.

43. The head stack assembly of claim 42 wherein the first portion and the second portion are positioned symmetrical to the longitudinal axis.

44. The head stack assembly of claim 43 wherein the first segment further includes a center portion, the center portion being positioned between and connected to the first portion and the second portion.

45. The head stack assembly of claim 44 wherein the center portion does not substantially interact with the magnetic field.

46. A disk drive including a storage disk, a drive housing and the head stack assembly of claim 43 movably secured to the drive housing.

47. A method for retrieving data from a target track on a rotating storage disk of a disk drive, the method comprising the steps of:

providing an E-block with a longitudinal axis;

securing a transducer assembly to the E-block, the transducer assembly including a data transducer;

providing a magnet assembly producing a magnetic field;

coupling a coil array to the E-block with the coil array being positioned near the magnet assembly, the coil array being a generally D-shaped loop including a first segment and a second segment that are adjacent to one another, the first segment including (i) a first portions, and (ii) a second portion, the first and second portions being perpendicular to the longitudinal axis, the first and second portions being positioned symmetrically about the longitudinal axis, and the second segment being curved where it intersects the longitudinal axis; and directing current to the coil array to move the data transducer relative to the target track, wherein directing current to the coil array includes directing current to the first portion and the second portion to generate a first force and a second force, respectively, wherein the first force is substantially equal in magnitude and opposite in direction to the second force.

48. The method of claim 47 wherein the first force and the second force are substantially parallel to the longitudinal axis.

49. A positioner for moving a data transducer relative to a storage disk in a disk drive, the positioner comprising:

a magnetic assembly including an upper magnetic array and a lower magnetic array, wherein the magnetic arrays each include an inner side, an outer side, and a pair of side wings therebetween, the inner side faces towards the data transducer and forms an arc, the outer side faces away from the data transducer, and the inner and outer sides are curved with reverse concavity relative to one another; and a coil array between the magnetic arrays, wherein the coil array is a generally D-shaped loop that includes a first segment and a second segment that are adjacent to one another, the first segment is positioned substantially perpendicular to a longitudinal axis of a head stack assembly that includes the data transducer, and the second segment is curved where it intersects the longitudinal axis.

50. A positioner for moving a data transducer relative to a storage disk in a disk drive, the positioner comprising:

a magnetic assembly including an upper magnetic array and a lower magnetic array, wherein the magnetic arrays each include an inner side, an outer side, and a pair of side wings therebetween, the inner side faces towards the data transducer and forms an arc, and the outer side faces away from the data transducer; and a coil array between the magnetic arrays, wherein the coil array is a generally D-shaped loop that includes first and second segments that are adjacent to one another at at a pair of corners, the first segment is positioned substantially perpendicular to a longitudinal axis of a head stack assembly that includes the data transducer, the second segment is curved where it intersects the longitudinal axis, and the corners are disposed on opposites sides of the longitudinal axis.

51. The positioner of claim 50 wherein the corners are substantially aligned with the wings in a direction perpendicular to the longitudinal axis.

52. The positioner of claim 50 wherein the corners are not substantially aligned with the wings in a direction parallel to the longitudinal axis.

53. A positioner for moving a data transducer relative to a storage disk in a disk drive, the positioner comprising:

a magnetic assembly including an upper magnetic array and a lower magnetic array; and a coil array between the magnetic arrays, wherein the coil array is a generally D-shaped loop that includes a first segment and a second segment that are adjacent to one another, the first segment is positioned substantially perpendicular to a longitudinal axis of a head stack assembly that includes the data transducer, the second segment is curved where it intersects the longitudinal axis, the magnetic arrays extend a first distance perpendicular to the longitudinal axis, the coil array extends a second distance perpendicular to the longitudinal axis, and the first and second distances are essentially identical.

54. A positioner for moving a data transducer relative to a storage disk in a disk drive, the positioner comprising:

a magnetic assembly including an upper magnetic array and a lower magnetic array;

a coil array between the magnetic arrays, wherein the coil array is a generally D-shaped loop of wire wrapped into a plurality of turns that includes a first segment and a second segment that are adjacent to one another, the first segment is substantially linear and the second segment forms an arc that is curved where it intersects a longitudinal axis of a head stack assembly that includes the data transducer; and a control system that electrically excites the coil array to interact with a magnetic field of the magnetic assembly;

wherein the magnetic arrays extend a first distance perpendicular to the longitudinal axis, the coil array extends a second distance perpendicular to the longitudinal axis, and the first and second distances are essentially identical.

55. A positioner for moving an E-block and a data transducer of a disk drive relative to a storage disk, the E-block having a longitudinal axis, the positioner comprising:
   a magnet assembly producing a magnetic field; and
   a coil array that couples to the E-block and is positioned near the magnet assembly, the coil array being a generally D-shaped loop including a first segment that is positioned substantially perpendicular to the longitudinal axis of the E-block, the first segment being adapted to interact with the magnetic field to move the E-block relative to the storage disk, wherein the first segment is substantially linear and includes (i) a first portion positioned on one side of the longitudinal axis of the E-block, and (ii) a second portion positioned on an opposite side of the longitudinal axis E-block, the first and second portions are adapted to interact with the magnetic field to move the E-block relative to the storage disk, and the first segment further includes a center portion, the center portion being positioned between the first and second portions, the center portion electrically connecting the first portion to the second portion, the center portion being positioned such that the center portion does not substantially interact with the magnetic field when the center portion is electrically excited.

56. A positioner for moving an E-block and a data transducer of a disk drive relative to a storage disk, the E-block having a longitudinal axis, the positioner comprising:
   a magnet assembly producing a magnetic field; and
   a coil array that couples to the E-block and is positioned near the magnet assembly, the coil array being a generally D-shaped loop including a first segment that is positioned substantially perpendicular to the longitudinal axis of the E-block, the first segment being adapted to interact with the magnetic field to move the E-block relative to the storage disk, wherein the first segment is substantially linear and includes (i) a first portion positioned on one side of the longitudinal axis of the E-block, and (ii) a second portion positioned on an opposite side of the longitudinal axis E-block, the first and second portions are adapted to interact with the magnetic field to move the E-block relative to the storage disk, and the coil array includes a second segment that is connected to the first segment, the second segment being positioned relative to the magnet assembly such that the second segment does not interact with the magnetic field when the second segment is electrically excited.

57. A head stack assembly for moving a data transducer of a disk drive relative to a target track of a storage disk, the bead stack assembly comprising:
   an E-block having a longitudinal axis;
   a transducer assembly secured to the E-block, the transducer assembly including a data transducer;
   a positioner including (i) a magnet assembly producing a magnetic field, (ii) a coil array secured to the E-block and positioned near the magnet assembly, the coil array being a generally D-shaped loop including a first segment positioned substantially perpendicular to the longitudinal axis, the first segment including (i) a first portion, and (ii) a second portion; and
   a control system that directs current to the coil array to move the data transducer relative to the target track;
   wherein the control system (i) directs current to the first portion to electrically excite the first portion, and (ii) directs current to the second portion to electrically excite the second portion;
   wherein (i) the electrically excited first portion interacts with the magnetic field to generate a first force and (ii) the electrically excited second portion interacts with the magnetic field to generate a second force;
   wherein (i) the first force is substantially equal in magnitude to the second force and (ii) the first force is substantially opposite in direction to the second force;
   wherein the first and second forces are substantially parallel to the longitudinal axis;
   wherein the first portion and the second portion are positioned symmetrical to the longitudinal axis;
   wherein the first segment further includes a center portion, the center portion being positioned between and connected to the first portion and the second portion; and
   wherein the center portion does not substantially interact with the magnetic field.

58. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the first segment is linear.

59. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the second segment has a continuous curvature.

60. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the second segment forms an arc of a circle.

61. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the first segment is linear and the second segment has a continuous curvature.

62. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the first segment is linear and the second segment forms an arc of a circle.

63. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the coil array consists of the first and second segments.

64. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the coil array consists of the first and second segments and the first segment is linear.

65. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the coil array consists of the first and second segments and the second segment has a continuous curvature.

66. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the coil array consists of the first and second segments and the second segment forms an arc of a circle.

67. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the coil array consists of the first and second segments, the first segment is linear and the second segment has a continuous curvature.

68. The positioner of claim 1, the head stack assembly of claim 13, the method of claim 20, the positioner of claim 23, the positioner of claim 37, the head stack assembly of claim 41, the method of claim 47, the positioner of claim 49, the positioner of claim 50, the positioner of claim 53 or the positioner of claim 54 wherein the coil array consists of the first and second segments, the first segment is linear and the second segment forms an arc of a circle.

* * * * *